United States Patent [19]

Womack

[11] Patent Number: 5,340,383

[45] Date of Patent: Aug. 23, 1994

[54] REDUCTION OF PARTICULATE SULFUR EMISSIONS FROM LIQUID SULFUR STORAGE TANKS

[75] Inventor: James T. Womack, Belle Chasse, La.

[73] Assignee: Freeport-McMoran Inc., New Orleans, La.

[21] Appl. No.: 150,991

[22] Filed: Nov. 12, 1993

[51] Int. Cl.⁵ ............................................ B01D 50/00
[52] U.S. Cl. ................................... 295/243; 55/268; 55/269; 95/257; 95/263; 96/190; 96/203; 96/218; 96/220; 165/111; 423/574.1; 423/578.1
[58] Field of Search ................... 55/268, 269; 95/243, 95/254, 256, 259, 263; 96/189, 190, 202, 203, 218, 220; 202/185.1; 165/111, 116, 118, 164; 423/574.1, 567.1, 578.1

[56] References Cited

U.S. PATENT DOCUMENTS

| | | | |
|---|---|---|---|
| 4,007,022 | 2/1977 | Schieicher et al. | 95/243 |
| 4,303,633 | 12/1981 | Thorsen | 425/574.1 |
| 4,391,791 | 7/1983 | Palm et al. | 423/574 R |
| 4,526,590 | 7/1985 | Palm et al. | 55/27 |
| 4,601,330 | 7/1986 | Palm et al. | 165/95 |
| 4,764,192 | 8/1988 | Heisel et al. | 55/269 |
| 4,995,945 | 2/1991 | Craig | 96/218 X |

Primary Examiner—Charles Hart
Attorney, Agent, or Firm—Fisher, Christen & Sabol

[57] ABSTRACT

In accordance with the method of this invention, sulfur is removed from the gas stream exiting a sulfur storage tank through condensation and impingement of droplets and/or particles of elemental sulfur on the baffles and wall(s) of indirectly cooled scrubber-condenser. In order to effect the melting and return to the liquid sulfur storage tank of any sulfur collected on the baffles and wall(s) of the scrubber-condenser, said baffles and wall(s) are periodically heated, preferably with indirect steam. The scrubber-condenser apparatus of this invention is designed to effect the condensation and solidification of sulfur from the gas stream and to maximize the impingement of sulfur droplets and particles upon its baffles and internal wall(s) by repeatedly changing the flow direction of said gas stream. The scrubber-condenser is vertically mounted on a liquid sulfur storage tank and is connected directly to a vent located on top of the tank.

21 Claims, 2 Drawing Sheets

REDUCTION OF PARTICULATE SULFUR EMISSIONS FROM LIQUID SULFUR STORAGE TANKS

FIELD OF THE INVENTION

This invention relates to a method and apparatus for the reduction of particulate sulfur emissions from liquid sulfur storage tanks. More specifically, this invention relates to a method for cooling a gas stream exiting from a liquid sulfur storage tank in a baffled scrubber-condenser. The scrubber-condenser is designed to effect the condensation and solidification of sulfur from the gas and to maximize the impingement of sulfur droplets and particles upon its baffles and internal wall(s) by repeatedly changing the flow direction of said gas stream. The scrubber-condenser is vertically mounted on a liquid sulfur storage tank and is connected directly to a vent located on top of the tank. The wall(s) as well as the baffles of the scrubber-condenser are jacketed to accommodate the flow of a cooling fluid through the jacket space, and also to facilitate periodic heating of the wall(s) and baffles with indirect steam in order to effect the melting and return to the tank of any sulfur accumulated on the wall(s) and baffles.

BACKGROUND OF THE INVENTION

Elemental sulfur is a commercially important raw material used in the production of sulfuric acid and numerous other chemicals. The global production of elemental sulfur is about 39 million tons per year, of which about 16 million tons per year are produced in North America. A very significant fraction of currently produced elemental sulfur is handled and stored as a liquid, i.e. in its molten form, at least at one point during the production-storage-transportation-consumption sequence of this material. In fact, some sulfur, after being produced in molten form, is never allowed to solidify during transportation and storage, and is consumed in liquid form as it is fed to sulfur burners to be converted to sulfur dioxide and eventually to sulfuric acid.

In light of the commercial importance of liquid sulfur as a chemical commodity, safe and environmentally acceptable methods of molten sulfur storage constitute an important component of sulfur technology. Current industrial practice entails usage of large heated and insulated liquid sulfur storage tanks, usually shaped in the form of large diameter vertical cylinders, constructed from mild steel, and typically ranging in capacity from 1,000 tons to 10,000 tons of elemental sulfur. In order to minimize heat losses, to prevent rain water from entering the tanks, and to minimize sulfur losses, liquid sulfur storage tanks are covered. Further, in order to allow for thermal expansion/contraction of the stored sulfur caused by temperature fluctuations and to prevent the possible build up of inorganic sulfur gases in the vapor space above the molten sulfur, the covers or roofs of storage tanks are equipped with at least one, and typically with two to ten vents. Since molten sulfur is usually sparged with air to prevent the possible build up in the molten sulfur of dissolved inorganic sulfur gases during storage of the molten sulfur, the vent(s) also serve to release from the tank the air which is used for such sparging.

The temperature of molten sulfur in the storage tanks is usually maintained between about 248° F. and about 302° F. In this temperature range the vapor pressure of elemental sulfur is very low namely between about 0.02 and about 0.2 mm Hg. Thus, the air in the vapor space above molten sulfur in sulfur storage tanks contains low concentrations of sulfur vapor, and may also contain minute quantities of elemental sulfur in the form of mist. As such sulfur-containing air passes through and exits the vent(s), its temperature decreases and at least some of its sulfur content condenses and solidifies into particles which are microscopic in size and tend to remain suspended in air, giving rise to what is referred to herein and in the sulfur industry as the formation and emission of particulate sulfur.

The rate of particulate sulfur emissions from a molten sulfur storage tank is primarily dependent on the air ventilation rate, and is also affected by other factors, including the temperature of the stored sulfur, the air sparging rate, the size and geometry of the tank, and the quantity of stored sulfur. Although the level of particulate sulfur emissions from molten sulfur storage tanks is generally very low, environmental concerns regarding such sulfur emissions persist.

There is no prior art known to the applicant which provides methodology for reducing the emission of particulate sulfur from molten sulfur storage tanks. U.S. Pat. No. 4,391,791 to Palm et al discloses a process and apparatus for the removal of elemental sulfur from gaseous streams, such as the tail gas of the Claus process. Claus process gas is formed through catalytic conversion of hydrogen sulfide and sulfur dioxide to water vapor and sulfur vapor in accordance with the following reaction:

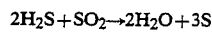

$$2H_2S + SO_2 \rightarrow 2H_2O + 3S$$

The resulting mixture of gases contains high concentrations of water vapor and sulfur vapor, as well as unreacted hydrogen sulfide and sulfur dioxide. The reaction is a chemical equilibrium which can be shifted toward the right side by using two or more catalyst beds operated at successively lower temperatures and by condensing sulfur vapor from the gas stream between the catalytic converters.

The process disclosed by Palm et al in their '791 Patent entails passing a gas stream containing vaporized elemental sulfur through two cooling zones, the first of which is maintained at conditions which serve to effect condensation of elemental sulfur without solidification thereof and the second of which is maintained at conditions which serve to effect the solidification of elemental sulfur, and periodically reversing both the direction of the gas flow as well as the conditions of the two cooling zones. The apparatus for removing and recovering vaporized elemental sulfur from a gas stream disclosed in the '791 Patent to Palm et al is a horizontal two-zone condenser of conventional shell and tube heat exchanger design, equipped with means to reverse the flow of gas to be treated therein, means to switch the temperature conditions of the two condenser zones, and means for recovering liquid sulfur from both heat exchange zones.

U.S. Pat. No. 4,526,590 to Palm et al discloses a process for cooling and condensing sulfur and water from Claus process gas. The process comprises passing a Claus process gas stream through a sulfur condenser, then passing the resulting gas stream through a first cooling zone maintained at conditions to effect condensation and solidification of sulfur without the condensation of water and next through a second cooling zone maintained at conditions to effect condensation of water. The first cooling zone of Palm et al's condenser is operated at a temperature below 225° F., typically about 200° F. while the second cooling zone of Palm et al's condenser is operated at a temperature below 125° F., typically about 100° F. U.S. Pat. No. 4,601,330 covers the corresponding apparatus claims; the '330 Patent to Palm et al issued upon a divisional of copending application which issued as U.S. Pat. No. 4,526,590. The apparatus disclosed by Palm et al in their '330 Patent is a horizontal two-zone condenser of conventional shell and tube heat exchanger design with the means and features required in the practice of the process claimed in their '590 Patent.

The processes or systems proposed by Palm et al for condensing sulfur and water vapor from Claus process gas in the three foregoing patents are not suitable for the reduction of particulate sulfur emissions from liquid sulfur storage tanks. This lack of suitability reflects the complexities of the processes and apparatuses claimed by Palm et al, the geometry of their equipment design, and other factors.

It is therefore an object of this invention to provide a simple, convenient and effective method and apparatus for the reduction of particulate sulfur emissions from liquid sulfur storage tanks.

It is another object of this invention to provide a method and apparatus for the reduction of particulate sulfur emissions from liquid sulfur storage tanks, wherein said method and apparatus do not require the use of condensers with two distinct condensation zones.

It is a further object of this invention to provide a method and apparatus for the reduction of particulate sulfur emissions from liquid sulfur storage tanks, wherein said method and apparatus are intrinsically capable of effecting the return to the liquid sulfur storage tank of sulfur collected in the apparatus of this invention, without the use of sulfur pumps and other auxiliary means.

It is still another object of this invention to provide a method for the removal of sulfur from low-volume gas streams containing low concentrations of sulfur vapor, such as gas streams evolved from liquid sulfur storage tanks.

SUMMARY OF THE INVENTION

The present invention provides a method and apparatus for the reduction of particulate sulfur emissions from liquid sulfur storage tanks. The method of this invention entails cooling the gas stream exiting a liquid sulfur storage tank in a baffled scrubber-condenser designed to effect the condensation and solidification of sulfur from the gas stream and to maximize the impingement of sulfur droplets and/or particles upon the internal wall(s) and baffles of the scrubber-condenser by repeatedly changing the flow direction of said gas stream. As a result of the combined effects of gas cooling and sulfur impingement, the gas stream exiting the scrubber-condenser following treatment in accordance with the method of this invention has a significantly lower propensity for forming particulate sulfur upon discharge to the atmosphere.

The apparatus of this invention is a scrubber-condenser, the wall(s) and baffles of which are hollow or jacketed to accommodate the flow of a cooling fluid through the jacket space during the normal mode of operation, and also to facilitate periodic heating of the wall(s) and baffles in order to effect the melting of any sulfur collected on the internal surfaces of the scrubber-condenser. The baffles of the scrubber-condenser are designed not only to maximize cooling and impingement efficiencies during the normal (cooling) mode of operation, but also to facilitate downward flow and return to the liquid sulfur storage tank of sulfur melted during the periodic steaming cycle. The scrubber-condenser apparatus of this invention is vertically mounted on the liquid sulfur storage tank and is connected directly to a vent located on top of the tank. The flow of air over the molten sulfur within the tank and through the scrubber-condenser apparatus of this invention may be facilitated by means of an air blower.

DETAILED DESCRIPTION OF THE INVENTION

The present invention provides a method and apparatus for the reduction of particulate sulfur emissions from liquid sulfur storage tanks. As already stated, air filling the void space above molten sulfur in a storage tank contains low concentrations of sulfur vapor, and may also contain minute quantities of elemental sulfur in the form of mist. When such sulfur-containing air exits through a conventional vent(s) mounted on the cover, or roof, of the storage tank, the temperature of said sulfur-containing air decreases as a result of exposure to ambient temperature, and at least some of its sulfur content condenses and solidifies, giving rise to the formation and emission of particulate sulfur. The method of this invention comprises passing the gas stream exiting a sulfur storage tank through a scrubber-condenser which is capable of cooling the gas stream to effect condensation and solidification of most of its sulfur vapor and which is further capable of repeatedly changing the direction of flow of the gas stream within the scrubber-condenser to effect impingement of sulfur droplets and/or particles upon the internal surfaces of the scrubber-condenser.

In accordance with this invention, the temperature of the gas stream entering the scrubber-condenser from the vapor space of the liquid sulfur storage tank is in the range between about 200° F. and about 300° F., while the temperature of the gas stream exiting the scrubber-condenser is in the range between about 90° F. and about 150° F. The gas stream exiting the scrubber-condenser is discharged to the atmosphere. A gas blower may be used downstream of the scrubber-condenser to aid in passing the gas stream from the vapor space of the liquid sulfur storage tank through the scrubber-condenser.

The condensation, solidification, and impingement of sulfur in the scrubber-condenser leads to an eventual buildup of elemental sulfur in this piece of equipment. Such accumulation of elemental sulfur in the scrubber-condenser is undesirable, primarily because it insulates the gas stream from the cooling surfaces and interferes with effective transfer of heat from the gas stream to the cooling water. Thus, in accordance with the method of this invention, the scrubber-condenser is periodically heated to effect the melting of sulfur accumulated therein and the return of said sulfur to the storage tank, wherein said sulfur is allowed to blend with the stored liquid sulfur.

Figure 1:
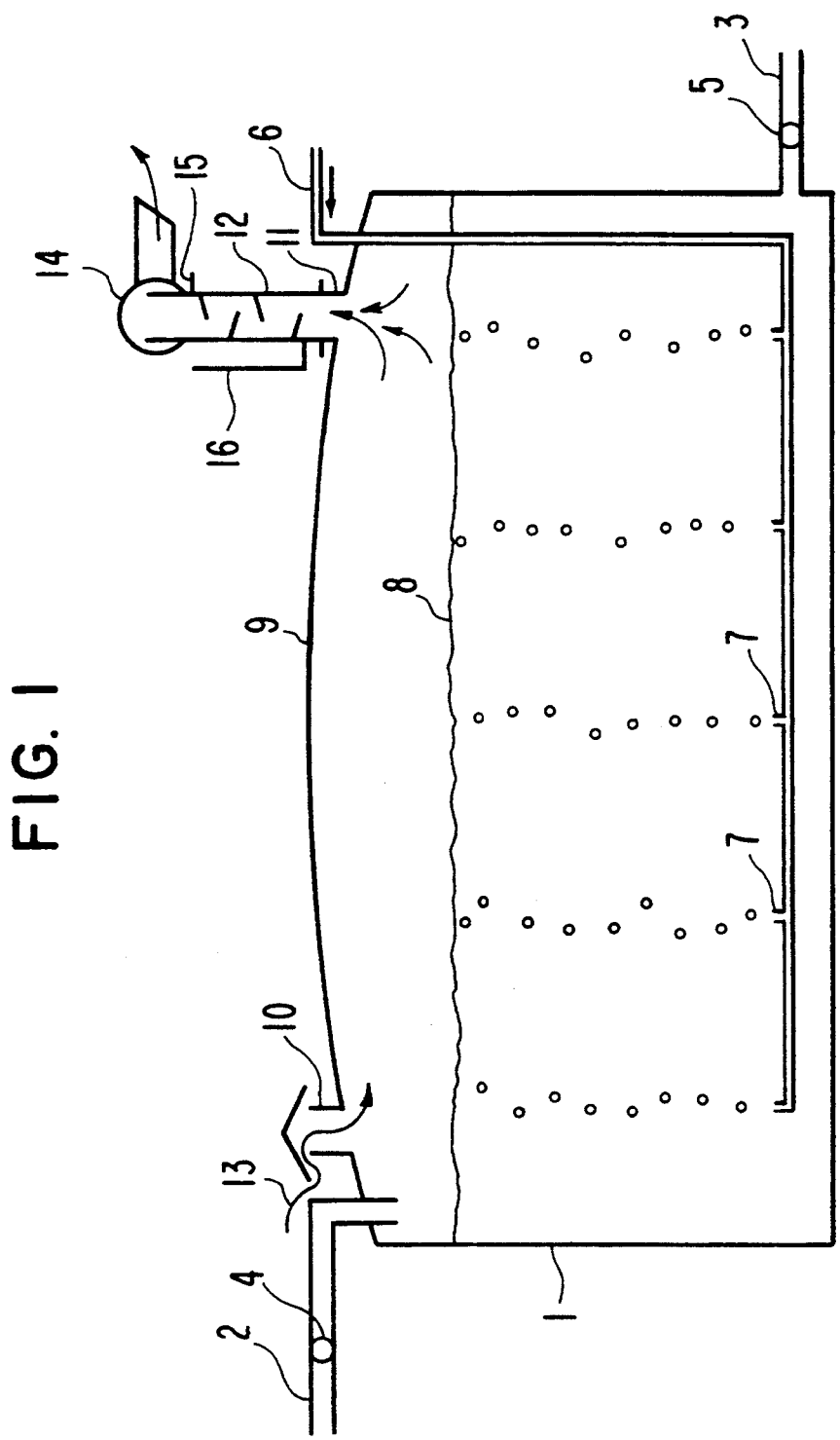
FIG. 1 is a simplified diagram illustrating a cross-sectional view of the preferred embodiment of the apparatus and method of this invention.

The preferred embodiment of the method of this invention will be discussed with reference to FIG. 1 which depicts a liquid sulfur storage tank 1, equipped with line 2 for introducing molten sulfur to said tank and line 3 for removing molten sulfur from said tank. Lines 2 and 3 are used only during the filling or emptying cycles, respectively, of the storage tank and are otherwise closed by means of valves 4 and 5, respectively. Preferably, liquid sulfur storage tank 1 is also equipped with line 6 for introducing compressed air in order to facilitate air-sparging of the liquid sulfur through a set of nozzles 7. The liquid sulfur level 8 in the storage tank varies depending on the amount of sulfur being stored. Preferably, the cover 9 of the liquid sulfur storage tank is equipped with two vents 10 and 11, one of which (vent 10) serves as an air intake vent and is open to the atmosphere, while the other (vent 11) is connected to the scrubber-condenser 12 of this invention, the design and essential features of which will be described hereinafter in reference to FIGS. 2 and 3.

In the preferred embodiment of the method of this invention, air which enters the vapor space of the liquid storage tank via vent 10 as shown by arrow 13 and via line 6 and nozzles 7, and which as a result of direct contact with liquid sulfur contains small concentrations of sulfur vapor and sulfur mist, is passed through scrubber-condenser 12 with the aid of gas blower 14 installed on top of the scrubber-condenser. Alternately, the blower may be connected to the air intake vent 10 to force the flow of air through vent 10, through the vapor space of the storage tank, through scrubber-condenser 12, and out to the atmosphere.

During the normal mode of operation, the internal wall(s) and baffles of the scrubber-condenser are cooled by feeding a cooling fluid, preferably cooling water, through inlet 15, resulting in an indirect transfer of heat from the gas phase to the cooling fluid, with a corresponding drop in the temperature of the gas stream from a range of about 200° F. to about 300° F. as it enters the scrubber-condenser to a range of about 70° F. to about 150° F. as the gas stream exits the scrubber-condenser. The temperature of the cooling fluid fed through inlet 15 should be below about 120° F., and preferably below about 70° F. The cooling fluid exits the scrubber-condenser through line 16. The condensation and solidification of sulfur in the gas stream is accompanied by impingement of sulfur droplets and particles on the internal wall(s) and baffles of the scrubber-condenser, said impingement being effected by repeated changes in the direction of the gas stream in the baffled scrubber-condenser apparatus of this invention.

As a result of the combined effects of gas cooling and sulfur impingement, the gas stream exiting the scrubber-condenser following treatment in accordance with the method of this invention has a significantly lower propensity for forming particulate sulfur upon discharge to the atmosphere. The reduction of particulate sulfur emissions from liquid sulfur storage tanks attainable in accordance with the method of this invention is in the range of about 50% to about 95%, depending primarily upon the cooling and impingement efficiency afforded by the scrubber-condenser.

As already noted, the condensation, solidification, and impingement of sulfur in the scrubber-condenser leads to an eventual build up of elemental sulfur in this piece of equipment. Thus, in accordance with the method of this invention, the scrubber-condenser is periodically heated with a heating fluid, preferably indirect saturated steam at a pressure of at least 30 psia (pounds per square inch absolute), by introducing the heating fluid instead of the cooling fluid through inlet 15 to effect the melting of sulfur accumulated in the scrubber-condenser and the return of said sulfur to the storage tank, allowing said sulfur to blend with the stored liquid sulfur. The frequency and duration of the heating cycle depends upon operational factors, such as the temperature gradient of the gas stream passing through the scrubber-condenser, the sulfur content and volume of the gas stream, and the size of the scrubber-condenser. Preferably, the scrubber-condenser is heated with saturated steam at a pressure between about 30 psia and about 90 psia once every 24 hours for a period of about 30 minutes, during which period the sulfur accumulated in the scrubber-condenser melts and flows under its own gravity back to the liquid sulfur storage tank.

Figure 2:
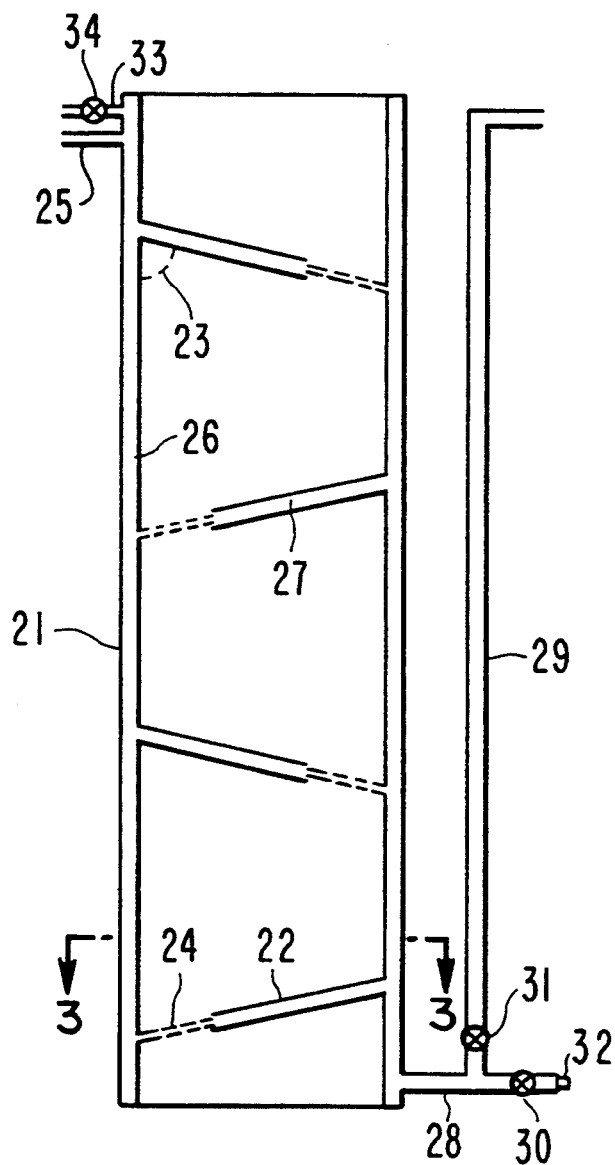
FIG. 2 is a simplified cross-sectional side view of the scrubber-condenser of this invention.
Figure 3:
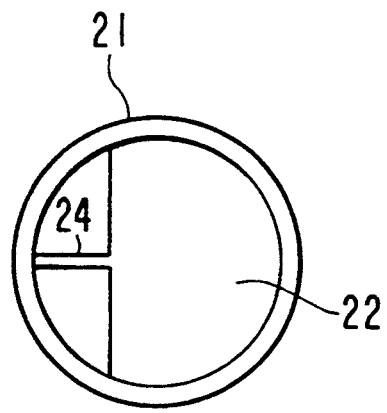
FIG. 3 is a cross-sectional view of the scrubber-condenser of FIG. 2 taken along line 3—3 thereof.

The scrubber-condenser apparatus of this invention will be described with reference to FIGS. 2 and 3. The apparatus comprises a vertical shell constituting the wall 21 of said scrubber-condenser and a plurality of baffles 22 mounted inside said shell. The wall 21 as well as the baffles 22 of the scrubber-condenser are hollow or jacketed to accommodate the flow of cooling water through the jacket space during the normal mode of operation, and also to facilitate periodic heating of the wall and baffles with indirect steam. (The terms "hollow" and "jacketed" are used interchangeably in this patent specification; as used herein, both of these terms characterize walls and baffles as being capable of providing indirectly heated or cooled heat exchange surfaces.) The number of baffles mounted within the scrubber-condenser may vary: at least two baffles should be provided, and preferably the number of baffles should be between three and six. The scrubber-condenser depicted in FIG. 2 is equipped with four baffles. The angle 23 between the baffles and the wall of the scrubber-condenser is between about 45° and about 85°, and preferably between about 60° and about 85°. As illustrated in FIG. 2, successive baffles extend downwardly from opposing sides of the scrubber-condenser wall. Each baffle is sized to extend over about 50% to about 80% of the internal cross-sectional area of the scrubber-condenser as depicted in FIG. 3. Furthermore, each baffle is equipped with a hollow or jacketed drain leg 24 connecting the jacket space of the wall and the baffles as shown in FIGS. 2 and 3, so that cooling fluid entering the scrubber-condenser through line 25 may pass freely through the jacket space of the walls 26, through the jacket space of the drain legs 24, and through the jacket space of the baffles 27, and exit the scrubber-condenser through lines 28 and 29, with valve 30 closed and valve 31 open. Thus, when a cooling fluid, such as cooling water, passes through the jacket space of the baffles and wall(s), the scrubber-condenser apparatus of this invention provides a single cooling zone or stage for the gas stream being passed through said apparatus. In accordance with this invention, the single stage scrubber-condenser is vertically mounted on the roof of a liquid sulfur storage tank and is connected directly to a vent located on top of the tank. Periodically, the interconnected jacket space of the scrubber-condenser is fed with steam introduced in lieu of the cooling fluid via line 25, with valve 30 open and valve 31 closed. Steam condensate is released from the scrubber-condenser through steam trap 32.

Optionally, the scrubber-condenser of this invention is equipped with air bleed line 33 and valve 34 which serve to remove air from the jacket space of the wall and baffles whenever desirable, as for example during start-up of the scrubber condenser system, when air occupying the jacket space of the wall and baffles needs to be replaced with cooling water.

The scrubber-condenser apparatus of this invention is preferably constructed of mild steel. However, any material having a sufficiently high heat transfer coefficient and satisfactory compatibility with molten sulfur, water, and steam may be used, as will be recognized by those skilled in the art.

The baffle system of the scrubber-condenser apparatus disclosed hereinabove causes repeated changes in the direction of gas flow through said apparatus. Consequently, this baffle system affords a unique combination of cooling and impingement efficiencies and is responsible for the effectiveness of the method and apparatus of this invention in reducing particulate sulfur emissions from liquid sulfur storage tanks. Furthermore, certain design features of the scrubber-condenser apparatus, notably the downward slope of its baffles, combined with the vertical installation of said apparatus directly atop of a liquid sulfur storage tank and with its capability of being periodically heated with indirect steam, result in an intrinsic ability of said apparatus to provide for the return of sulfur accumulated therein to the storage tank by gravity flow, without the need for sulfur pumps and other auxiliary equipment.

In its preferred embodiment, the vertical scrubber-condenser of this invention is cylindrical, i.e. has a circular cross-section as illustrated in FIG. 3; however, other cross-sectional shapes, such as a rectangular cross-section associated with a four-wall scrubber-condenser design, are also acceptable and fall within the scope of this invention.

The present invention provides the first known method and apparatus for reducing particulate sulfur emissions from liquid sulfur storage tanks. Both the method as well as the apparatus disclosed hereinabove are characterized by several highly desirable features. The method of this invention does not require the use of chemical reagents in the scrubber-condenser, and features operational simplicity, low operating costs, and satisfactory effectiveness in reducing particulate sulfur emissions from liquid sulfur storage tanks. The apparatus of this invention combines the simplicity of single stage scrubber-condenser design with good performance effectiveness and with an intrinsic ability to return elemental sulfur which tends to accumulate in the scrubber-condenser during its normal mode of operation back to the liquid sulfur storage tank without the need for sulfur pumps and other ancillary equipment.

EXAMPLES

The following examples illustrate the effectiveness of the method and apparatus of this invention to reduce particulate sulfur emissions from a liquid sulfur storage tank. The liquid sulfur storage tank used in these examples had a nominal storage capacity of 9,000 tons of liquid sulfur, and was charged with 8,000 tons of liquid sulfur. The tank was equipped with an air sparging system operated at 40 ACFM (Ambient Cubic Feet per Minute). The roof of the tank was equipped with two peripheral vents, one of which was fitted with a scrubber-condenser designed and vertically positioned as described hereinabove with reference to FIGS. 1, 2, and 3. The scrubber-condenser was fabricated of mild steel, had an inside diameter of ten inches, was five feet tall, and was equipped with four baffles positioned about 10 inches apart vertically between the highest points at which the baffles were fitted to the inside wall. The baffles were mounted with a downward slope of 15°; i.e. the angle between the wall of the scrubber-condenser and the baffles designated in FIG. 2 as angle 23 was 75°. Each of the four baffles covered about 66% of the internal cross-sectional area of the scrubber-condenser. The scrubber-condenser apparatus was fitted with two steam-jacketed sampling lines (not shown in FIGS. 1, 2, and 3) one of which served to sample the gas stream entering said apparatus while the other served to sample the gas stream exiting said apparatus. A blower was attached to the upper aperture of the scrubber-condenser and was operated at a total ventilation rate of 200 ACFM. Thus, the 40 ACFM of air used for sparging the sulfur were supplemented with 160 ACFM of air entering the vapor space of the sulfur storage tank through the air intake vent 10 (see FIG. 1).

The results of the examples are summarized in Table 1. As recorded in the table, in Example No. 1 the molten sulfur was stored in the tank at a temperature of 282° F. in Example No. 2 the molten sulfur was stored at a temperature of 268° F. and in Example No. 3 the molten sulfur was stored at a temperature of 266° F. The concentrations of sulfur in samples of the gas stream entering the scrubber-condenser are designated in Table 1 as "Conc. of Sulfur—Sample Point A", while the concentrations of sulfur in samples of the gas stream exiting the scrubber-condenser are designated as "Conc. of Sulfur—Sample Point B"; in both cases these concentrations are expressed in pounds of elemental sulfur per ambient cubic foot (lbs/ACF) of gas.

TABLE 1

| Example No. | Molten Sulfur Temperature (°F.) | Conc. of Sulfur Sample Point A (lbs/ACF) | Conc. of Sulfur Sample Point B (lbs/ACF) | Sulfur Removal (%) |
| --- | --- | --- | --- | --- |
| 1 | 282 | $3.9 \times 10^{-5}$ | $1.67 \times 10^{-5}$ | 57 |
| 2 | 268 | $2.4 \times 10^{-5}$ | $0.56 \times 10^{-5}$ | 77 |
| 3 | 266 | $2.2 \times 10^{-5}$ | $0.40 \times 10^{-5}$ | 82 |

It should be borne in mind that the concentrations of sulfur in the gas stream discharged from the sulfur storage tank to the atmosphere in the absence of the scrubber-condenser of this invention would be identical to the concentrations of sulfur in the gas stream entering the scrubber-condenser in Examples 1 through 3, referred to in Table 1 as "Conc. of Sulfur—Sample Point A". Thus, the sulfur removal efficiency experienced in Examples 1 through 3 is indicative of the ability of the method and apparatus of this invention to reduce the emission of particulate sulfur from liquid sulfur storage tanks. As evident from the data shown in the last column of Table 1, in these three Examples the sulfur removal efficiency ranged from 57% to 82%.

What is claimed is:

1. A method for reducing particulate sulfur emissions from a liquid sulfur storage tank having a roof and from which a gas stream containing elemental sulfur in vapor form, liquid droplet form, solid particulate form or any two or three such forms is vented, comprising passing said gas stream into contact with the internal walls and baffles of a baffled scrubber-condenser to impinge said elemental sulfur on said internal walls and baffles, and cooling said internal walls and baffles to condense, solidify and collect said elemental sulfur in said gas stream impinging on said internal walls and baffles.

2. The method of claim 1, wherein said impingement of said elemental sulfur on said internal walls and baffles is effected by repeated changes in the direction of flow of said gas stream within said baffled scrubber-condenser.

3. The method of claim 1, wherein said gas stream is cooled in said baffled scrubber-condenser from a temperature of about 200° F. to about 300° F. to a temperature of about 90° F. to about 150° F.

4. The method of claim 1, wherein said cooling of said gas stream is effected by means of indirect contact with cooling water passed through jacketed walls and baffles of said scrubber-condenser.

5. The method of claim 4, wherein said cooling water fed to said scrubber-condenser has a temperature below about 120° F.

6. The method of claim 4, wherein said cooling water fed to said scrubber-condenser has a temperature below about 70° F.

7. The method of claim 1, wherein said passing of said gas stream through said baffled scrubber-condenser is aided by means of a gas blower.

8. The method of claim 1, wherein said scrubber-condenser is vertically mounted on the roof of said liquid sulfur storage tank and wherein said scrubber-condenser is connected directly to one of at least two vents located on the roof of said tank.

9. The method of claim 8, wherein said scrubber-condenser is periodically heated, in lieu of being cooled, to melt sulfur collected on the internal walls and baffles of said scrubber-condenser and wherein the baffles of said scrubber-condenser extend downward from opposing sides of the scrubber-condenser wall to facilitate downward gravity flow of the melted sulfur and its return to said storage tank.

10. The method of claim 9, wherein said scrubber-condenser is periodically heated using indirectly saturated steam at a pressure ranging between about 30 psia and 90 psia.

11. A scrubber-condenser apparatus for reducing particulate sulfur emissions from a liquid sulfur storage tank having a roof and at least one vent through which a gas stream containing elemental sulfur in vapor form, liquid droplet form, solid particulate form or any two or three such forms exits said sulfur storage tank, said scrubber-condenser apparatus comprising:

a. a vertical jacketed shell constituting the wall or walls defining said scrubber-condenser, and b. a plurality of jacketed baffles mounted inside said shell and extending downward from opposing sides of said shell, wherein said jacketed shell and said jacketed baffles are capable of being indirectly cooled to effect the condensation, solidification and collection of sulfur from said gas stream and of being periodically indirectly heated to effect the melting of sulfur accumulated in said apparatus.

12. The apparatus of claim 11, wherein said baffles are positioned to cause repeated changes in the direction of flow of said gas stream within said shell of said apparatus and of effecting the impingement of sulfur vapor, droplets and particles in said gas stream upon the internal walls and baffles of said scrubber-condenser apparatus.

13. The apparatus of claim 11, wherein the number of said jacketed baffles is at least two.

14. The apparatus of claim 11, wherein the number of said jacketed baffles is the range from 3 to 6.

15. The apparatus of claim 11, wherein the angle between said jacketed shell and each said baffle is between about 45° and about 85°.

16. The apparatus of claim 11, wherein the angle between said jacketed shell and each said baffle is between about 60° and about 85°.

17. The apparatus of claim 11, wherein said baffles and said shell have internal jacket spaces that are connected and wherein said scrubber-condenser is of single stage design.

18. The apparatus of claim 11, wherein said shell has the shape of a vertical cylinder.

19. The apparatus of claim 11, wherein said shell has a rectangular cross-section.

20. The apparatus of claim 11, wherein said sulfur storage tank has at least two vents located on said roof and said scrubber-condenser is mounted on said roof and is attached to one of said vents located on said roof.

21. The apparatus of claim 20, wherein said scrubber-condenser is provided with means for periodically heating said internal walls and baffles of said scrubber-condenser to melt sulfur accumulated thereon, and to facilitate downward flow of the resulting melted sulfur and its return to said storage tank.

* * * * *